US005831804A

United States Patent [19]

Vilou

[11] Patent Number: 5,831,804

[45] Date of Patent: Nov. 3, 1998

[54] METHOD AND APPARATUS FOR CONTROLLING A CONTACTOR FOR POWERING A MOTOR VEHICLE STARTER

[75] Inventor: Gérard Vilou, Tassin, France

[73] Assignee: Valeo Equipments Electriques Moteur, Creteil, France

[21] Appl. No.: 822,358

[22] Filed: Mar. 20, 1997

[30] Foreign Application Priority Data

Mar. 21, 1996 [FR] France .................................. 96 03509

[51] Int. Cl.[6] ....................................................... H02H 5/04

[52] U.S. Cl. ..................................... 361/28; 123/146.5 D; 123/179.3; 324/420

[58] Field of Search ................................. 361/22, 23, 28, 361/29, 30, 31, 33, 54, 55, 56, 57, 58, 88, 92, 93; 324/420, 422, 424; 123/146.5 D, 179.3, 179.5; 290/38 R

[56] References Cited

U.S. PATENT DOCUMENTS 4,345,554 8/1982 Hildreth .
5,345,901 9/1994 Siegenthaler et al. .
5,601,058 2/1997 Dyches et al. ....................... 123/179.2

FOREIGN PATENT DOCUMENTS 2679717 1/1993 France .

*Primary Examiner*—Ronald W. Leja
*Attorney, Agent, or Firm*—McCormick, Paulding & Huber

[57] ABSTRACT

Starting power supply to starter windings is interrupted whenever a power contact for the starter is still open after a predetermined time delay from initiation of the power supply to the starter. The invention also provides apparatus for controlling a contactor of a motor vehicle starter, said contactor including at least one winding and a power contact which, on being closed, serves to supply power to the starter, the apparatus including circuitry detecting the open or closed state of the power contact and for interrupting or reducing starting power supply to the winding(s) in the event the power contact is still open at the end of a predetermined time delay from initiation of power supply to the starter.

8 Claims, 2 Drawing Sheets

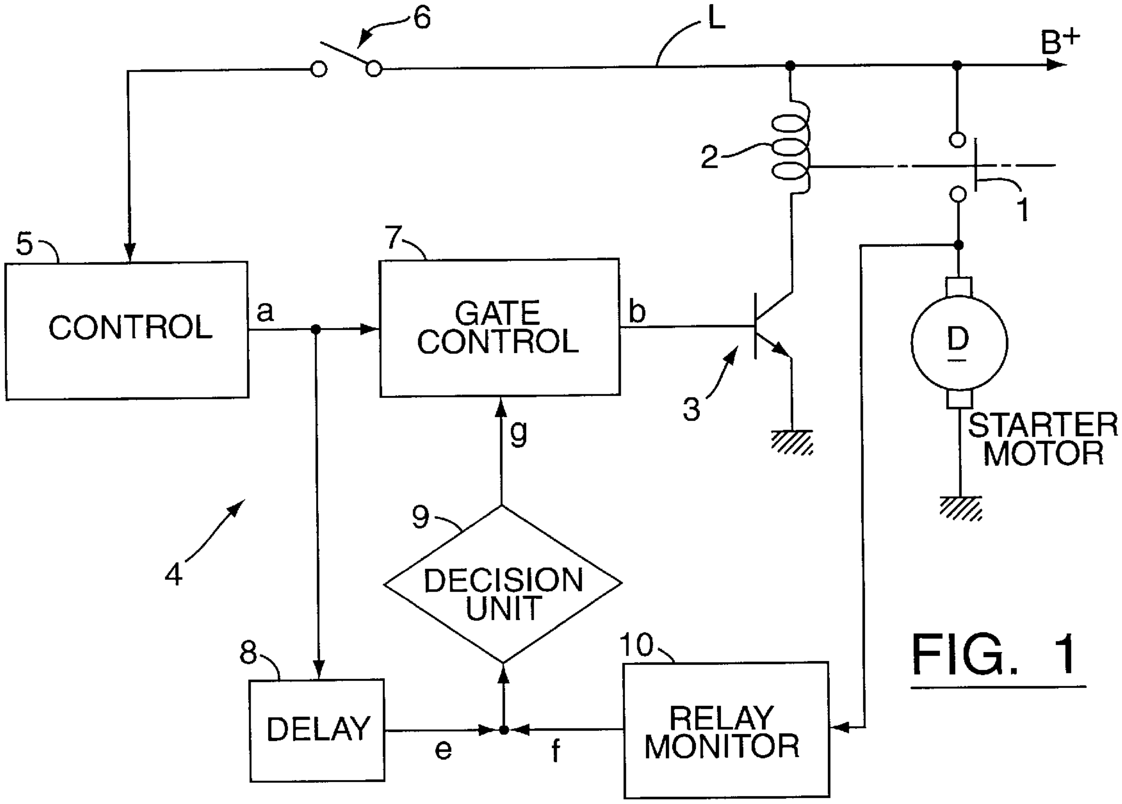
FIG. 1
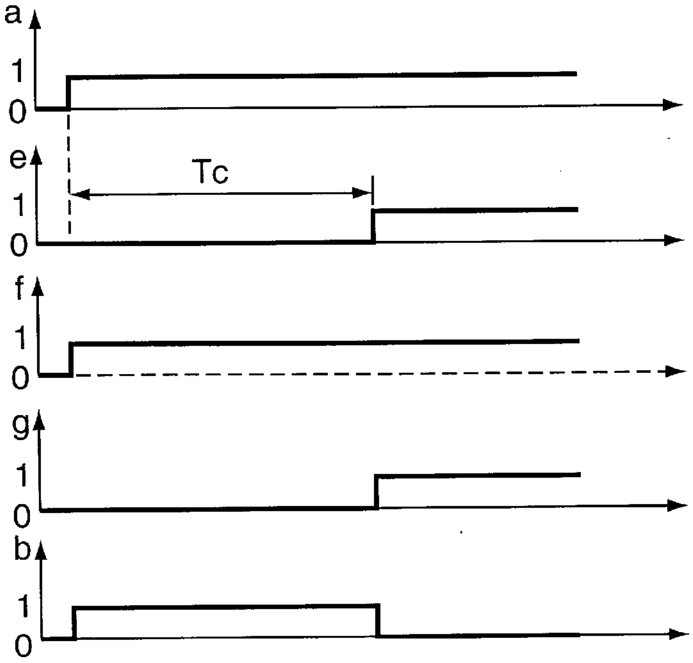
FIG. 2a
FIG. 2b
FIG. 2c
FIG. 2d
FIG. 2e

METHOD AND APPARATUS FOR CONTROLLING A CONTACTOR FOR POWERING A MOTOR VEHICLE STARTER

The present invention relates to methods and apparatuses for controlling a contactor for the starter of a motor vehicle.

BACKGROUND OF THE INVENTION

Conventionally, power is fed to the starter of a motor vehicle under the control of a power contactor having a coil driven by an electronic circuit.

The role of such a contactor is firstly to constitute a linear actuator for displacing a starter pinion along a drive shaft from a rest position to a position in which it meshes with a toothed wheel situated beneath a flywheel, and secondly to constitute a power relay whose contact serves to feed power to the electric motor of the starter, said motor serving to rotate the starter pinion.

For an example of the structure of a car starter, reference may be made, for example, to U.S. Pat. No. 5,345,901.

In general, the controlling electronics includes a transistor type switch which controls the flow of current through the coil of the contactor. Control can be on/off or progressive, as proposed in French patent application No. FR 2 679 717.

Initially, the coil is powered in a starting state or mode by a strong current suitable for developing the mechanical forces required for propelling the starter pinion into the toothed wheel for starting the engine.

Thereafter, if the contactor has two windings, comprising a start winding and a hold winding, the power supply changes at the end of the above period to a lower level of current that is sufficient for holding the power contactor in the closed position.

In the starting state or mode, because of the high currents involved, the contactor coil (whether it has one or more windings) and the control transistor generate considerable amounts of heat.

This mode of operation is normally of very short duration, being of the order of a few tenths of a second, thereby avoiding damage to the above-mentioned components due to thermal effects.

Nevertheless, in the event of the power switch operating wrongly, the starting mode can continue for as long as the vehicle key is held in the starting position.

This duration is determined by what the vehicle driver thinks to be appropriate; and in practice that can sometimes be several tens of seconds, which is plenty of time to damage the transistor or the coil of the contactor.

Unfortunately, the power switch can fail to close for numerous reasons: in addition to mechanical causes, there may be non-conductive matter on a contact surface: e.g. dust, insulating particles, frost, oxidation, . . . .

OBJECTS AND SUMMARY OF THE INVENTION

An object of the invention is thus to propose a control method and apparatus enabling damage to the transistor or the coil of the contactor to be avoided in the event of the starting state or mode being too long because the contactor has failed to operate.

U.S. Pat. No. 4,345,554 has already disclosed a controlling electronic circuit for a starter that deactivates the power supply thereto when the motor fails to start at the end of a predetermined length of time. Nevertheless, that form of control is not entirely satisfactory. It can lead to the power supply to the starter being switched off when the power contact is indeed closed.

According to the invention, the power supply to the winding(s) driving a starting mode is interrupted or reduced whenever the power contact is still open after a predetermined time delay from the beginning of power supply to the starter.

The invention also provides apparatus for controlling a contactor of a motor vehicle starter, said contactor including at least one winding and a power contact which, on being closed, serves to supply power to the starter, the apparatus including means for detecting the open or closed state of the power contact and means for interrupting or reducing starting power supply to the winding(s) in the event of the power contact still being open at the end of a predetermined time delay from the beginning of starting mode.

Advantageously, the apparatus further includes the following characteristics taken on their own or in any technically possible combination:

- it includes means for generating a start control signal, in particular when the vehicle key is turned to the starting ?? position, a regulator element for regulating the power supply current to the winding(s), control means for controlling said regulation elements, said control means receiving a start control signal, the means for interrupting or reducing the starting power supply including delay means to which the start control signal is applied, and decision means which receive as inputs the output signals first from the delay means and secondly from the means for detecting the open or closed state of the power contact, said decision means issuing an output signal that informs the control means for controlling the regulator element that the power contact is open at the end of the time delay;
- the decision means comprise a logic gate having one input receiving the output signal from the delay means and another input receiving a signal corresponding to the output signal from the means for detecting the open or closed state of the power contact, the output from said logic gate being connected by means of a diode to the output of said control means for controlling the regulator element;
- the logic gate is a NAND gate;
- the second input of the logic gate is connected to a power supply terminal via means that are mainly resistive, and also to one end of a switch whose other end is connected to ground and which is controlled by the output signal from the means for detecting the open or closed state of the power contact;
- the means for detecting the open or closed state of the power contact include smoothing means;
- the means for detecting the open or closed state of the power contact include means for measuring the voltage across the terminals of the starter or for measuring the current flowing therethrough, or indeed for measuring the speed of rotation of the starter or of the engine;
- the detector means comprise a zener diode whose cathode voltage constitutes the signal controlling the switch, the cathode of said diode being connected to a point between the power contact and the starter, its anode being connected to ground; and
- the detector means further include mainly resistive means for limiting the current flowing through said diode in the event of excess voltage.

BRIEF DESCRIPTION OF THE DRAWINGS

Other characteristics and advantages of the invention appear further from the following description. The description is purely illustrative and non-limiting. It should be read with reference to the accompanying drawings, in which:

FIG. 1 is a block diagram showing a possible embodiment of the apparatus of the invention;

FIGS. 2*a* to 2*e* show a possible control sequence for the apparatus of FIG. 1.

MORE DETAILED DESCRIPTION

Figure 3:
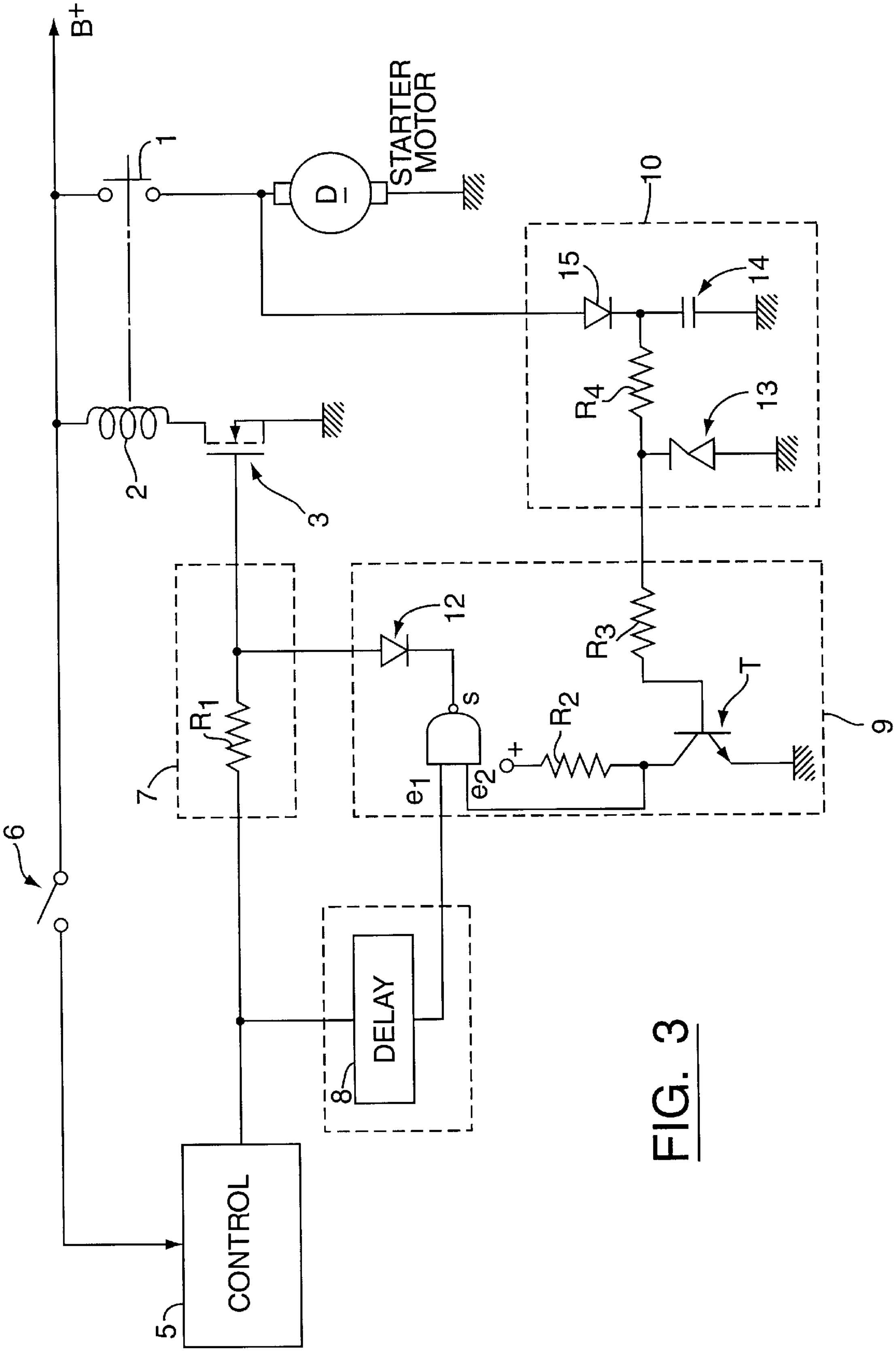
FIG. 3 is a diagram similar to FIG. 1 and shows another possible embodiment of apparatus of the invention.

FIG. 1 shows an electric motor D which constitutes the starter of the vehicle and which is operated under the control of a power contact 1.

The electric motor D is connected between ground and a battery power supply voltage terminal B+.

The contact or relay 1 is interposed between the power supply terminal B+ and the motor D.

It is controlled by a winding 2 connected between the power supply terminal B+ and ground. The power supply to the relay 2 is itself controlled by a switch 3 interposed between the winding 2 and ground.

In the example described, the switch 3 is a MOSFET type transistor, whose drain is connected to the relay 2 and whose source is connected to ground.

The gate voltage of the transistor 3 is controlled by an electronic circuit 4 which is described below.

The electronic circuit 4 comprises a control unit 5 which controls the gate voltage of the transistor 3 so as to control the sequence with which power is applied to the winding 2 during the various operating stages of the starter (start power, holding the contact closed, automatically stopping the starter once the engine has started, etc.). The unit 5 also provides various other functions such as thermal protection for the starter, protection against trying to start again once the engine is running, etc.

The control unit 5 receives various kinds of information about the operation of the starter D. It is also connected to a power supply line L at vehicle battery voltage and under the control of the vehicle ignition key 6.

Output signal a from the control unit 5 is applied to gate control means 7 for switching off the transistor 3 and serving to generate the voltage which is applied to the gate of the transistor 3. By way of example, the means 7 controls the transistor 3 so that it operates as a switch or so that it is powered in sequence or in a progressive manner.

By way of example, the signal a may be of the binary signal type as shown in FIG. 2*a*, having a level "1" which corresponds to the transistor 3 being switched off, and a level "0" which causes it to be switched on. The signal a switches to level "1" when the vehicle ignition key is operated.

The signal a is also applied to a delay unit 8.

Signal e, output by the unit 8, is delayed relative to the signal a by a time period Tc (FIG. 2*b*).

It is applied to a decision unit 9 simultaneously with a signal f (FIG. 2*c*) which is a binary signal representative of the open or closed state of the contact 1.

The signal f is generated by a unit 10 which detects the open or closed state of the power contact 1, e.g. as a function of measuring the voltage across the terminals of the starter D, or measuring the current flowing therethrough.

In a variant, the signal f may be generated as a function of measuring the speed either of the electric motor constituting the starter or the engine.

In the example shown, solid lines in FIG. 2*c* show a binary signal corresponding to the signal f when the power contact 1 closes immediately after the start command given by signal a, while dashed lines show the signal f in the event of the power contact not closing during the delay period.

The unit 10 advantageously includes a circuit for smoothing its input signal so as to avoid triggering electronic protection in untimely mariner under the effect of a transient break in the power contact which could arise, for example, due to contact bounce or to switching interference from the electric motor.

The signal g output by the unit 9 is a signal of the type shown in FIG. 2*d* and it takes the value "1" whenever the power contact 1 has not closed at the end of the delay from the unit 8, i.e. whenever the signal f is at "0" while the signal e has passed to level "1".

The signal g is transmitted together with the signal a to the gate control 7 for switching off the transistor 3.

The signal b (FIG. 2*e*) generated by control 7 causes the transistor 3 to be switched off in the event of the signal a being at level "1" while the signal g is at level "0".

In contrast, as soon as the signal g goes to level "1", i.e. as soon as it is detected that the relay contact 1 has opened after the end of the time delay, the signal b switches to level "0" and the transistor 3 is switched off (open circuit).

The duration Tc of the time delay is selected to be short enough for there to be no irreversible damage to the transistor 3 or to the winding 2 if the power contact 1 does not close, while nevertheless being long enough to ensure that the starter pinion is propelled into its working position.

In practice, values in the range 0.5 seconds (s) to 10 s are suitable.

Reference is now made to FIG. 3.

The various means of the FIG. 1 apparatus are shown in greater detail therein.

The control means 7 for controlling the gate of the transistor are constituted by a resistor $R_1$.

The delay unit 8 is constituted by a standard timer circuit which switches to level "1" on expiry of a given delay period Tc after receiving a level "1" signal.

The decision unit 9 comprises a NAND gate 11 having a first input $e_1$ connected to the output of the delay unit 8 and having a second input $e_2$ connected to the collector of a bipolar switching transistor T. The collector is loaded by a resistor $R_2$ connected to the power supply terminal at battery voltage.

The emitter of the transistor T is connected to ground.

The output s of the NAND gate 11 is connected to the gate of transistor 3 via a diode 12 which prevents conduction from said output s to the gate.

In the absence of a positive signal on its base (signal f at level "0"), the transistor T is not conductive and the second input of the NAND gate is at level "1".

The output from the logic gate 11 is then at level "0" when the signal e switches to level "1" at the end of the delay. The gate of transistor 3 is then at a voltage close to 0. The starting current passing through the transistor 3 and the winding 2 is reduced to a negligible value, thereby ensuring that the situation presents no risk from the thermal point of view.

In all other states of the signals e and f at the inputs of the gate 11, the signal g of the output from said gate 11 is at level "1".

Under such circumstances, the diode 12 serves to prevent any influence on the control generated by the unit 5. The voltage on the gate of transistors is then directly controlled by the level of the signal a output by the control unit 5.

The unit 10 shown in FIG. 3 serves both to calibrate and to smooth the voltage on the positive terminal of the electric motor.

It includes a zener diode 13 whose anode is connected to ground and whose cathode is connected via a resistor $R_3$ to the base of transistor T.

The cathode of diode 13 is also connected via a resistor $R_4$ to one end of a capacitor 14 whose other end is connected to ground. The common point between the capacitor 14 and the resistor $R_4$ is connected to a point between the contact 1 and the starter D, via a diode 15.

When contact 1 is closed, the signal f output by the unit 10 is at the zener voltage of the diode 13, with the voltage across the terminals of the starter motor D which is subjected to self-inductance effects, being limited by said zener diode 13.

The resistor $R_4$ limits the current flowing through the diode 13 in the event of excess voltage.

The capacitor 14 eliminates the undesirable effects of transient breaks and of interference. The diode 15 prevents the capacitor 14 from discharging quickly via the starter D during such transient breaks.

When the contact 1 is open, the signal f output by said unit 10 is at level "0", since the input voltage is zero.

The apparatus described above presents numerous advantages.

It serves to reduce the cost of the electronics for controlling the starter, since thermal stresses on the transistor 3 and on the winding 2 are reduced.

This also means that it is easier to locate the electronics for controlling the starter.

Control reliability is also improved.

I claim:

1. Apparatus for controlling a contactor of a motor vehicle starter, said contactor including at least one winding and a power contact which, on being closed, serves to supply power to the starter; the apparatus including means for detecting the open or closed state of the power contact and means for interrupting or reducing power supply to the winding in the event of the power contact still being open at the end of a predetermined time delay from the initiation of the supply of power to the starter, a vehicle ignition key, a means for generating a starting control signal when the ignition key is turned to an "on" position, said means for interrupting or reducing power including an element for regulating the supply of current to the winding, control means for controlling said regulator element, said control means receiving the starting control signal, said means for interrupting the starter power supply also including delay means to which the starting control signal is applied, and decision means which receives as inputs output signals first from the delay means and secondly from the means for detecting the open or closed state of the power contact, said decision means issuing an output signal that informs the control means for controlling the regulator element that the power contact is open at the end of the time delay.

2. Apparatus according to claim 1, wherein the decision means comprises a logic gate having one input receiving the output signal from the delay means and a second input receiving a signal corresponding to the output signal from the means for detecting the open or closed state of the power contact, the output from said logic gate being connected by means of a diode to the output of said control means for controlling the regulator element.

3. Apparatus according to claim 2, wherein the logic gate is a NAND gate.

4. Apparatus accordion to claim 3, wherein the second input of the logic gate is connected to a power supply terminal via means that are mainly resistive, and also to one end of a switch whose other end is connected to ground and which is controlled by the output signal from the means for detecting the open or closed state of the power contact.

5. Apparatus according to claim 4, wherein the means for detecting the open or closed state of the power contact include one of a means for measuring voltage across the terminals of the starter, a means for measuring the current flowing through the starter, a means for measuring the speed of rotation of the starter, and a means for measuring the speed of rotation of an engine associated with the starter, and wherein the detecting means comprises a zener diode whose cathode voltage constitutes the signal controlling the switch, the cathode of said diode being connected to a point between the power contact and the starter, and its anode being connected to ground.

6. Apparatus according to claim 5, wherein the detecting means further includes mainly resistive means for limiting the current flowing through said diode in the event of excess voltage.

7. Apparatus according to claim 1, wherein the means for detecting the open or closed state of the power contact include smoothing means.

8. Apparatus according to claim 1, wherein the means for detecting the open or closed state of the power contact include means responsive to completion of a starting operation comprising a one of a means monitoring voltage across the terminals of the starter, a means monitoring current flowing through the starter, a means monitoring speed of rotation of the starter, and a means monitoring an engine associated with the starter.

* * * * *

UNITED STATES PATENT AND TRADEMARK OFFICE

CERTIFICATE OF CORRECTION

PATENT NO. : 5,831,804
DATED : November 3, 1998
INVENTOR(S) : Gerard Vilou

It is certified that error appears in the above-identified patent and that said Letters Patent is hereby corrected as shown below:

Column 3, line 21, after "the" insert --starter--.
line 22, after "a" insert --relay--.
line 25, after "the" insert --relay--.

Signed and Sealed this

Tenth Day of August, 1999

Attest:

Q. TODD DICKINSON

Attesting Officer

*Acting Commissioner of Patents and Trademarks*